United States Patent
Bayle et al.

(10) Patent No.: US 7,971,683 B2
(45) Date of Patent: Jul. 5, 2011

(54) ACOUSTIC PROTECTIVE PANEL FOR VEHICLE COMPRISING AN IMPREGNATED SEALING LAYER

(75) Inventors: Andre-Xavier Bayle, Reims (FR); Jean-Christophe Stein, Bouy (FR)

(73) Assignee: Centre d'Etude et de Recherche pour l'Automobile (CERA), Reims (FR)

( * ) Notice: Subject to any disclaimer, the term of this patent is extended or adjusted under 35 U.S.C. 154(b) by 0 days.

(21) Appl. No.: 12/524,594

(22) PCT Filed: Nov. 20, 2007

(86) PCT No.: PCT/FR2007/001902
§ 371 (c)(1),
(2), (4) Date: Jul. 27, 2009

(87) PCT Pub. No.: WO2008/096049
PCT Pub. Date: Aug. 14, 2008

(65) Prior Publication Data
US 2010/0108437 A1    May 6, 2010

(30) Foreign Application Priority Data
Feb. 6, 2007  (FR) ...................... 07 00838

(51) Int. Cl.
*E04B 1/82*    (2006.01)
*E04B 1/84*    (2006.01)
*F02B 77/13*   (2006.01)
*E04B 1/74*    (2006.01)
*F02B 77/00*   (2006.01)

(52) U.S. Cl. ........ 181/286; 181/204; 181/290; 296/39.3

(58) Field of Classification Search .................. 181/286, 181/204, 290, 205, 294; 296/39.3, 39.1, 296/97.23, 1.03; 180/69.22, 69.23
See application file for complete search history.

(56) References Cited

U.S. PATENT DOCUMENTS

| | | | | |
|---|---|---|---|---|
| RE19,840 E | * | 1/1936 | Woodall | 180/90 |
| 3,149,875 A | * | 9/1964 | Stata | 296/97.23 |
| 4,048,366 A | * | 9/1977 | Kingsbury | 428/215 |
| 4,083,595 A | * | 4/1978 | Maier | 296/39.3 |
| 4,456,092 A | * | 6/1984 | Kubozuka et al. | 181/290 |
| 4,493,390 A | * | 1/1985 | Pagano et al. | 181/204 |
| 4,521,473 A | * | 6/1985 | Sakamoto et al. | 428/82 |

(Continued)

FOREIGN PATENT DOCUMENTS
DE    19814956 A1    10/1999
(Continued)

OTHER PUBLICATIONS
International Search Report dated Jun. 6, 2008.

*Primary Examiner* — Edgardo San Martin
(74) *Attorney, Agent, or Firm* — Bachman & LaPointe, P.C.

(57) ABSTRACT

An acoustic protective panel for the fitting of a wall of a vehicle, has an upper porous layer, in particular with a felt or remelted flexible foam base, at least one zone of the porous layer being arranged on one sealing layer, the sealing layer being arranged on one backing layer (5) with a flexible polyurethane base forming a spring, said sealing layer being formed by impregnation on a portion of the thickness of the porous layer by the polyurethane of the backing layer overmolding the porous layer. Architectures for mounting such a panel are described.

16 Claims, 1 Drawing Sheet

U.S. PATENT DOCUMENTS

| | | | | |
|---|---|---|---|---|
| 4,563,965 A * | 1/1986 | Gregory | | 112/302 |
| 4,579,764 A * | 4/1986 | Peoples et al. | | 428/95 |
| 4,705,139 A * | 11/1987 | Gahlau et al. | | 181/290 |
| 4,715,473 A * | 12/1987 | Tschudin-Mahrer | | 181/286 |
| 4,824,498 A * | 4/1989 | Goodwin et al. | | 156/71 |
| 4,829,627 A * | 5/1989 | Altus et al. | | 16/4 |
| 5,509,712 A * | 4/1996 | Rausch et al. | | 296/124 |
| 5,557,078 A * | 9/1996 | Holwerda | | 181/208 |
| 5,567,922 A * | 10/1996 | Schmuck et al. | | 181/284 |
| 5,824,974 A * | 10/1998 | Campbell | | 181/290 |
| 6,073,990 A * | 6/2000 | Sauve | | 296/146.7 |
| 6,102,465 A * | 8/2000 | Nemoto et al. | | 296/39.3 |
| 6,106,045 A * | 8/2000 | Gac et al. | | 296/39.1 |
| 6,299,961 B1 * | 10/2001 | Pelzer | | 428/95 |
| 6,547,301 B1 * | 4/2003 | Keller | | 296/39.3 |
| 6,808,045 B2 * | 10/2004 | Campbell | | 181/205 |
| 6,951,263 B2 * | 10/2005 | Blomeling et al. | | 181/204 |
| 6,971,475 B2 * | 12/2005 | Tompson et al. | | 181/204 |
| 6,974,172 B2 * | 12/2005 | Gebreselassie et al. | | 296/39.3 |
| 7,070,848 B2 * | 7/2006 | Campbell | | 428/137 |
| 7,080,712 B2 * | 7/2006 | Tsuiki et al. | | 181/204 |
| 7,320,739 B2 * | 1/2008 | Thompson et al. | | 156/308.2 |
| 7,762,375 B2 * | 7/2010 | Matsuyama et al. | | 181/290 |
| 2003/0159880 A1 * | 8/2003 | Blomeling et al. | | 181/204 |
| 2004/0224131 A1 * | 11/2004 | Cowelchuk et al. | | 428/157 |
| 2005/0046217 A1 * | 3/2005 | Campbell | | 296/39.3 |
| 2005/0046218 A1 * | 3/2005 | Campbell | | 296/39.3 |
| 2005/0126848 A1 * | 6/2005 | Siavoshai et al. | | 181/207 |
| 2010/0065366 A1 * | 3/2010 | Soltau et al. | | 181/286 |

FOREIGN PATENT DOCUMENTS

| | | |
|---|---|---|
| EP | 1555105 A2 | 7/2005 |
| EP | 1837241 A1 * | 9/2007 |
| FR | 2847196 A1 * | 5/2004 |
| FR | 2864922 A1 * | 7/2005 |
| FR | 2866034 A1 * | 8/2005 |
| FR | 2892357 A1 * | 4/2007 |
| FR | 2894910 A1 * | 6/2007 |
| FR | 2897832 A1 * | 8/2007 |
| FR | 2899171 A1 * | 10/2007 |
| FR | 2899854 A1 * | 10/2007 |
| FR | 2900377 A1 * | 11/2007 |
| FR | 2900614 A1 * | 11/2007 |
| JP | 03279048 A * | 12/1991 |
| WO | 9201587 A1 | 2/1992 |
| WO | 0220307 A1 | 3/2002 |

* cited by examiner

ACOUSTIC PROTECTIVE PANEL FOR VEHICLE COMPRISING AN IMPREGNATED SEALING LAYER

BACKGROUND (1) Field of the Invention

The invention relates to an acoustic protective panel for the fitting of a wall of a vehicle and an architecture for mounting such a panel.

(2) Prior Art

It is known to carry out an acoustic protective panel for the fitting of a wall of a vehicle, said panel comprising an upper porous layer, said porous layer being arranged on one sealing layer, said sealing layer being arranged on one backing layer with a flexible polyurethane base formant a spring.

Such a realisation makes it possible to have a panel creating a sound insulation of the mass/spring type, the mass being formed by the sealing layer and the spring by the backing layer, and an absorption linked to the presence of the porous layer, making it possible in particular to reduce the noise nuisances coming from the leaks, localised in particular on orifices made in the panel for the crossing of members such as steering columns.

However, such a realisation has a complexity in terms of implementation, linked in particular to the fact that the sealing layer must be carried out, for example with a thermoplastic elastomer base filled with a mineral filler. In the case with panels with non-developable geometry, it may further be required to proceed with a conformation of said layer, for example by thermoforming.

The sealing layer once it is conformed must then be associated to the porous layer and to the backing layer, with the backing layer overmoulding for example the sealing layer.

As can be seen, these various operations have a certain complexity.

SUMMARY OF THE INVENTION

The invention has for purpose to overcome this disadvantage.

To this effect, and according to a first aspect, the invention proposes an acoustic protective panel for the fitting of a wall of a vehicle, said panel comprising an upper porous layer, in particular with a felt or remelted flexible foam base, at least one area of said porous layer being arranged on one sealing layer, said sealing layer being arranged on one backing layer with a flexible polyurethane base forming a spring, said sealing layer being formed by impregnation on a portion of the thickness of said porous layer by the polyurethane of said backing layer overmoulding said porous layer.

In this description, the terms of positioning in space (upper, etc.) are taken in reference to the panel arranged in the vehicle.

The embodiment proposed as such makes it possible to carry out the sealing layer by overmoulding of the porous layer by the flexible polyurethane, said flexible polyurethane penetrating partially the thickness of the porous layer in order to form said sealing layer.

According to a second aspect, the invention proposed an architecture for mounting such a panel.

BRIEF DESCRIPTION OF DRAWINGS

Other particularities and advantages of the invention shall appear in the description which follows, given in reference to the attached figures wherein.

DETAILED DESCRIPTION OF THE PREFERRED EMBODIMENT(S)

Figure 1:
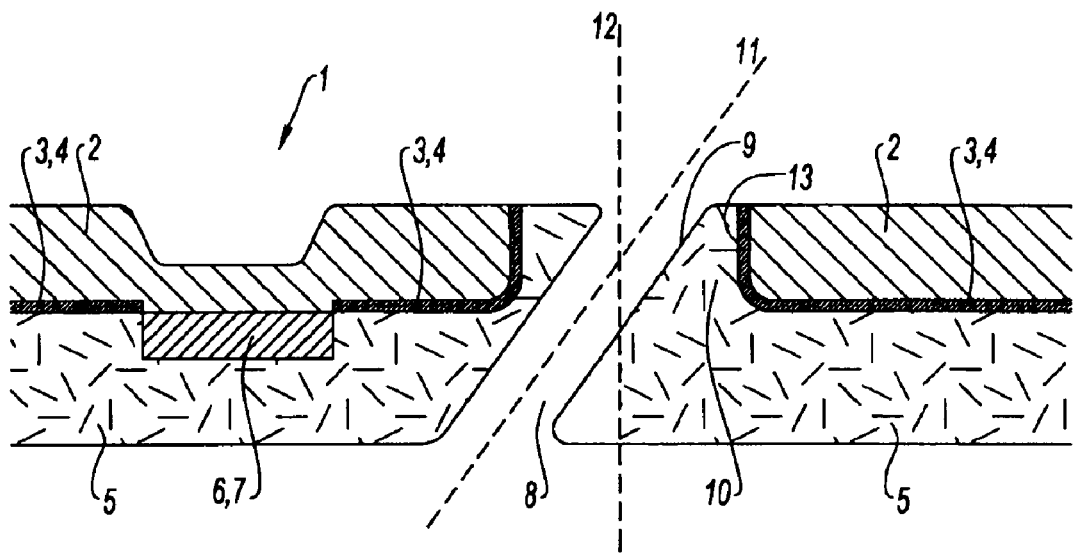
FIG. 1 is a schematic partial cross section view of a panel according to an embodiment.

In reference to the figures, an acoustic protective panel 1 for the fitting of a wall of a vehicle is described, said panel comprising an upper porous layer 2, in particular of a felt or remelted flexible foam base, at least one zone 3 of said porous layer being arranged on one sealing layer 4, said sealing layer being arranged on one backing layer 5 with a flexible polyurethane base, in particular polyurethane foam, forming a spring, said sealing layer being formed by impregnation on a portion of the thickness of said porous layer by the polyurethane of said backing layer overmoulding said porous layer.

Sealing layer 4 means in particular a layer conferring to the complex formed by the porous layer 2 and said sealing layer a resistance to the passage of air greater than 5000 $N \cdot S \cdot m^{-3}$.

It can be arranged, in the case of panels of complex geometry, that the porous layer 2 be thermoformed.

The portion of thickness of the porous layer 2 impregnated by the flexible polyurethane must be as thin as possible, in such a way as to leave a maximum thickness of non-impregnated porous layer 2, this in order to confer to said porous layer optimised properties of absorption. It must nevertheless be sufficient in order to carry out the expected sealing.

According to an embodiment, the impregnated portion shows a fraction less than 25% of the thickness of the porous layer 2.

More particularly, the impregnated portion can even show a fraction less than 20% of the thickness of the porous layer 2.

Punctually, certain areas can however have an impregnation that is greater, in particular the compressed areas, but, over the major portion of the three-layer panel 1, the impregnation is such as that described hereinabove.

In an example of an embodiment, the porous layer 2 has a general thickness of 7 mm, with localised compressed areas of 3 to 4 mm of thickness, with the thickness of the impregnated portion being approximately 1 mm.

According to an embodiment, the porous layer 2 is of a foam base with a surface density between 100 and 1000 $g/m^2$.

According to another embodiment, the porous layer 2 is of a felt base with a surface density between 1000 and 2000 $g/m^2$.

When the porous layer 2 has a felt base, the latter can be of a thermoplastic and/or plant fibre base (cotton, etc.) linked to one another by a binder.

In the case of an application in a hot environment, for example in the vicinity of an engine or of an exhaust line, the felt can be provided with a fibre glass base linked to one in relation to the other for example by a thermo-setting resin.

According to an embodiment, the porous layer 2 has a thickness and/or a variable density.

To this effect, it can be carried out for example, when the porous layer 2 comprises a thermoplastic material, a hot-pressing differentiated from said layer.

In a manner that is not shown, an area of increased density can correspond to a peripheral crown around an orifice intended to allow for the passage of a crossing member, such as a steering column, said member being intended to be in clamping contact with said orifice. The densification carried out makes it possible to decrease the porosity of the porous layer 2 on the crown and as such improve the seal between the member and the periphery of the orifice, in such a way as to limit the acoustical leakage. Typically, it is provided that such a crown have a density at least two times greater than the density of the porous layer 2 as undensified area.

Other methods for obtaining areas of variable density shall now be described.

As explained for example in FR-2 866 034, it can be provided that the porous layer 2 be of a fibre base arranged as filling in a first moulding cavity, in such a way as to carry out a temporary mattress according to a first geometry. Said mattress is then hot-conformed according to a second geometry, which makes it possible to obtain areas of variable density and/or thickness.

Alternatively, fibre can be projected as variable thickness onto a mould bottom, said thickness being controlled by means of a robot that controls the projection of the fibres, a punch then being applied as hot-pressing on the fibres in order to give rise to a three-dimensional porous layer 2.

The embodiments based on the filling or on the projection of fibres make it possible in particular to obtain a porous layer 2 having at least two areas of a minimum surface of 25 cm$^2$ of which the density differs by at least a factor of 1.5. The areas of high density correspond for example to areas of rigidification or, as described above, to a peripheral crown of an orifice.

According to the embodiment in FIG. 1, a sealed and flexible reinforced density layer 6 is inserted, on an area of reinforced protection 7, between the porous layer 2 and the backing layer 5, said layer of reinforced density being overmoulded by said backing layer.

According to the embodiment in FIG. 1, the panel 1 comprises at least one member crossing orifice 8, the wall 9 of said orifice being formed of mousse of the backing layer 5 coating the wall of an added orifice 10 of upper section made in the porous layer 2, before the overmoulding operation.

Such a realisation makes it possible to carry out a clamping contact between the crossing orifice 8 and the crossing member, with a foam/member contact, which solves the problems encountered when the porous layer 2 is a felt, the felt/member contact able to not be optimal due to a tearing of the felt, which causes acoustical leakage.

Figure 2:
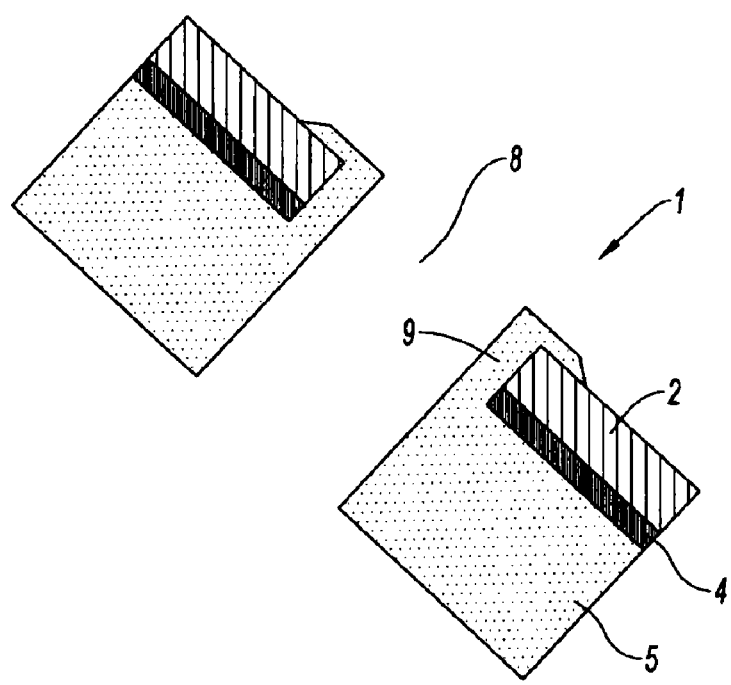
FIG. 2 is a schematic partial cross section view of a panel area provided with an orifice according to an embodiment.

According to the embodiment in FIG. 2, the foam extends at the periphery of the orifice 8 beyond the side of the porous layer 2. As such, a gasket avoiding the mounting of a specific gasket on the crossing member can be generated, said member being arranged in such a way as to be able to compress the foam on either side of the orifice 8 according to the axis of said orifice.

According to the embodiment in FIG. 1, the axis 11 of the crossing orifice is different from the axis 12 of the added orifice 10, the mousse coating the wall 13 of the added orifice 10 according to a variable thickness. A good seal can as such be carried out in the case of a crossing of members that is inclined in relation to panel 1 in the crossing area.

According to an alternative that is not shown, the foam may not coat the wall 13 of the added orifice 10, the clamping contact being carried out still between the foam and the member, despite a possible tearing of the porous layer 2 when it is of a felt base.

According to an embodiment that is not shown, the porous layer 2 comprises at least one zone that is conformed, for example in the form of a lug, in such a way as to form a means for fixing and/or centring.

According to an embodiment that is not shown, the porous layer 2 comprises a coating sub-layer, for example with a carpet or non-woven base, associated on its backing with a porous sub-layer, in such a way that the panel 1 forms a floor mat.

According to an embodiment that is not shown, the porous layer 2 comprises a main sub-layer, for example made of felt, associated on its backing with a porous barrier sub-layer, for example with a non-woven base co-needled with said main sub-layer, said barrier sub-layer having in particular a resistance to the passage of air greater than that of said main sub-layer and being impregnated with foam, while still leaving said main sub-layer substantially free of foam in such a way that it absorbs the noise in an optimal manner.

The presence of such a barrier sub-layer makes it possible to avoid an excessive penetration of the foam into the porous layer 2, and as such to best preserve its properties of absorption.

It can be provided that the backing layer 5 have a damping coefficient greater than 0.25 so as to be viscoelastic, the porous layer 2 being substantially rigid and mounted in such a way as to be located, at substantially every point, at a distance less than the corresponding thickness of the free state of the backing layer 5 to said point, in such a way as to compress said backing layer, for example by a magnitude of 2.5 to 10%, over substantially all of its surface against the wall of the vehicle, in order to sound proof the hectomeric waves, according to a stress layer principle.

The invention claimed is:

1. An acoustic protective panel for the fitting of a wall of a vehicle, said panel comprising: an upper porous layer of a felt or remelted flexible foam base, at least one zone of said upper porous layer being arranged on a sealing layer, said sealing layer being arranged on a backing layer with a flexible polyurethane base forming a spring, said sealing layer being formed by impregnation on a portion of a thickness of said upper porous layer by the polyurethane of said backing layer overmoulding said upper porous layer.

2. The panel as set forth in claim 1, wherein a complex formed by the upper porous layer and the sealing layer has a resistance to the passage of air greater than 5000 N·S·m$^{-3}$.

3. The panel as set forth in claim 1, wherein the upper porous layer is formed from a foam base with a surface density between 100 and 1000 g/m$^2$ or a felt base with a surface density between 1000 and 2000 g/m$^2$.

4. The panel as set forth in claim 1, wherein the portion of thickness of the upper porous layer impregnated by the polyurethane shows a fraction less than 25% of the thickness of said upper porous layer.

5. The panel as set forth in claim 1, wherein the upper porous layer has at least one of a thickness and a variable density.

6. The panel as set forth in claim 1, further comprising: at least one member crossing orifice, and the upper porous layer comprising an area of increased density corresponding to a peripheral crown around said orifice.

7. The panel as set forth in claim 1, wherein the upper porous layer has at least two zones of a minimum surface of 25 cm$^2$ of which the density differs by at least a factor of 1.5.

8. The panel as set forth in claim 1, wherein a sealed and flexible layer of reinforced density is inserted over an area of reinforced protection between the upper porous layer and the backing layer.

9. The panel as set forth in claim 1, further comprising: at least one member crossing orifice, a wall of said crossing orifice being formed of the flexible polyurethane of the backing layer coating a wall of an added orifice of an upper section in the upper porous layer.

10. The panel set forth in claim 6, wherein the flexible polyurethane of the backing layer extends at a periphery of the crossing orifice from a side of the upper porous layer.

11. The panel as set forth in claim 9, wherein an axis of the crossing orifice is different from an axis of the added orifice, and the flexible polyurethane coating a wall of said added orifice has a variable thickness.

12. The panel as set forth in claim 1, wherein the upper porous layer comprises at least one zone conformed in such a way as to form a means for at least one of fixing and centering.

13. The panel as set forth in claim 1, wherein the upper porous layer comprises two sub-layers.

14. The panel as set forth in claim 13, wherein said sub-layers include an upper sub-layer which forms a coating so that said panel forms a floor mat.

15. The panel as set forth in claim 14, wherein said sub-layers include a lower sub-layer which forms a barrier to the impregnation of the upper sub-layer by the flexible polyurethane of the backing layer.

16. An architecture for the mounting of a panel as set forth in claim 1, comprising: the backing layer having a damping coefficient greater than 0.25 in such a way as to be viscoelastic, and the upper porous layer being substantially rigid and mounted in such a way as to be located at substantially every point at a distance less than a corresponding thickness of a free state of the backing layer to said point in such a way as to compress said backing layer over substantially all of its surface against a wall of the vehicle in order to sound proof the hectomeric waves.

* * * * *